United States Patent
DeSalvo et al.

(10) Patent No.: US 8,098,991 B2
(45) Date of Patent: Jan. 17, 2012

(54) WIDEBAND RF PHOTONIC LINK FOR DYNAMIC CO-SITE INTERFERENCE MITIGATION

(75) Inventors: Richard DeSalvo, Satellite Beach, FL (US); Charles Middleton, Rockledge, FL (US); Michael Borbath, Indialantic, FL (US); Jeffrey A. Wyatt, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 709 days.

(21) Appl. No.: 12/194,558

(22) Filed: Aug. 20, 2008

(65) Prior Publication Data

US 2010/0046952 A1    Feb. 25, 2010

(51) Int. Cl.
*H04B 10/00*    (2006.01)

(52) U.S. Cl. ........ 398/115; 398/159; 398/141; 398/183; 398/188; 398/202; 398/213; 398/214; 398/212; 385/11; 385/15; 385/39; 385/140; 359/245; 359/237

(58) Field of Classification Search .................. 398/182, 398/183, 188, 192, 193, 194, 195, 196, 197, 398/198, 200, 201, 115, 152, 202, 214, 208, 398/209, 210, 211, 212, 213, 102, 161, 158, 398/159, 116, 117, 186, 140, 141, 185, 187; 385/11, 15, 39, 140, 1, 2, 3, 5, 8, 14, 122, 385/9, 10; 359/245, 237, 248, 238

See application file for complete search history.

(56) References Cited

U.S. PATENT DOCUMENTS

| | | | | |
|---|---|---|---|---|
| 5,644,665 A | * | 7/1997 | Burns et al. | 385/3 |
| 6,131,013 A | | 10/2000 | Bergstrom et al. | |
| 6,304,369 B1 | * | 10/2001 | Piehler | 359/337.4 |
| 6,441,932 B1 | * | 8/2002 | Helkey | 398/5 |
| 6,597,316 B2 | | 7/2003 | Rao et al. | |
| 6,693,971 B1 | | 2/2004 | Kowalski | |
| 2009/0263144 A1 | * | 10/2009 | McKinney | 398/214 |

* cited by examiner

*Primary Examiner* — Hanh Phan
(74) *Attorney, Agent, or Firm* — Harness, Dickey & Pierce, P.L.C.

(57) ABSTRACT

A method is provided for co-site interference mitigation in an RF communication system. Spectral nulls created in an optical domain may be used to mitigate interfering signals in an RF signal. The method includes: receiving an RF input signal via an antenna; generating two optical signals that are each modulated using the RF signal; creating a phase delay in one of the two optical signals that corresponds with a spectral null at a frequency of an interfering signal; converting the two optical signals into two corresponding electrical signals and combining the two electrical signals to create spectral nulls via interference between the two signals and form a mitigated output signal. In this way, the spectral null offsets the amplitude of the interfering signal, thereby reducing the signal strength of the interfering signal.

12 Claims, 3 Drawing Sheets

US 8,098,991 B2

WIDEBAND RF PHOTONIC LINK FOR DYNAMIC CO-SITE INTERFERENCE MITIGATION

FIELD

The present disclosure relates to RF communications systems and, more particularly, to a system and method for co-site interference mitigation in such systems.

BACKGROUND

RF communication systems are required to operate effectively in increasingly adverse spectral environments. Obstacles to RF communications include non-stationary co-site interference, ambient communication signals and hostile jamming interference. Typical interference levels can be very high and can often exceed the signals of interest by 30 decibels or more. Such interference overwhelms the operational capabilities of most commercial and military grade communication systems. Thus, there is a need for a system and method for co-site interference mitigation in RF communication systems.

The statements in this section merely provide background information related to the present disclosure and may not constitute prior art.

SUMMARY

A method is provided for co-site interference mitigation in an RF communication system. Spectral nulls created in an optical domain may be used to mitigate interfering signals in an RF signal. The method includes: receiving an RF input signal via an antenna; generating two optical signals that are each modulated using the RF signal; creating a relative phase delay in one of the two optical signals, corresponding to a spectral null at a frequency of an interfering signal; converting the two optical signals into two corresponding electrical signals and combining the two electrical signals to form a mitigated output signal. In this way, the spectral null offsets the amplitude of the interfering signal, thereby reducing the signal strength of the interfering signal. A spectral null may be created by introducing a time delay into the optical signal and the frequency at which the spectral null occurs can be tuned by adjusting the duration of the time delay.

This method for interference mitigation may be implemented in an RF photonic link which serves as a signal input to a communication device. The RF photonic link is comprised generally of: an antenna; an optical modulator that receives an RF input signal from the antenna and outputs two optical signals modulated with the RF input signal; a pair of balanced photodetectors optically coupled via optical links to the two output ports of the optical modulator; and an optical delay mechanism disposed in one of the two optical links that operates to introduce a time delay into the optical signal passing through the optical link. The RF photonic link may further include a controller interfaced with the optical delay mechanism for adjusting the duration of the time delay applied by the optical delay mechanism.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
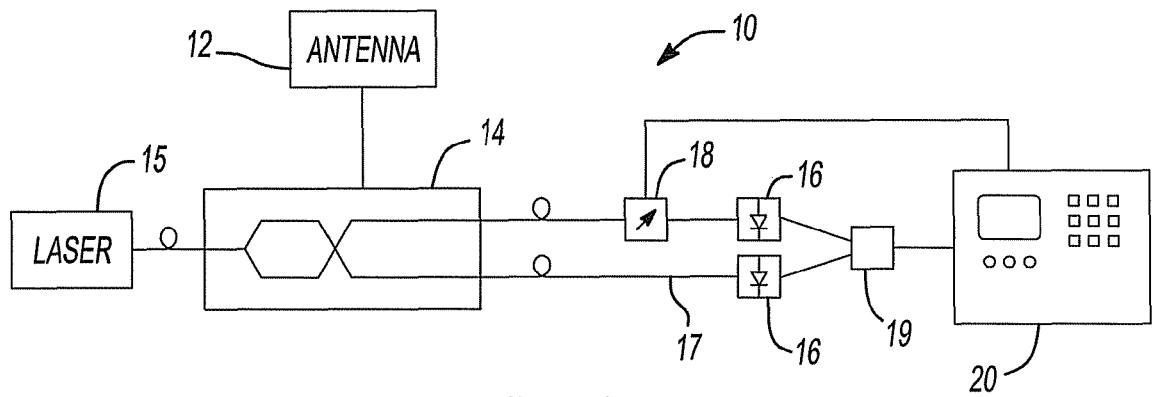
FIG. 1 is a diagram of an exemplary RF photonic link implemented in accordance with the principles of the present disclosure.

FIG. 1 illustrates an exemplary RF photonic link implemented in accordance with the principles of the present disclosure. The RF photonic link 10 is comprised generally of an antenna 12; an optical modulator 14; a pair of photodetectors 16 optically coupled to the optical modulator 14; an optical delay mechanism 18 disposed in one of the two optical links between the optical modulator 14 and the pair of photodetectors 16; and a signal combiner 19 which receives the output from each of the photodetectors 16. The RF photonic link may further include a controller 20 interfaced with the optical delay mechanism 18 for adjusting the duration of the time delay applied by the optical delay mechanism 18. Other arrangements for the RF photonic link are contemplated within the broader aspects of the present disclosure. In addition, it is understood that the RF photonic link serves as an input to a receiver component of a radio or another type of device in an RF communication system.

In operation, the antenna 12 is configured to receive an RF input signal over a wide range of frequencies (e.g., 1-20 GHz). The optical modulator 14 in turn receives the RF input signal from the antenna 12 and an optical signal from a continuous wave laser 15. The optical modulator 14 operates to modulate the optical signal using the RF input signal. In an exemplary embodiment, the optical modulator is implemented using a Mach-Zehnder modulator having dual output ports such that a modulated optical signal is output from each output port. Other types of dual output modulators are also contemplated by this disclosure.

A pair of photodetectors 16 are optically coupled via optical links 17 to the two output ports of the optical modulator 14. Each photodetector 16 operates to convert an optical input signal into an electrical output signal. Electrical signals from each of the photodetectors 16 are received by a signal combiner 19 which in turn outputs a single electrical signal.

An optical delay mechanism 18 is disposed in one of the two optical links 17. In an exemplary embodiment, an optical delay is introduced using a variable optical delay. A variable optical delay is a programmable device that can vary the amount of optical signal delay by changing the optical path lengths. Such devices can be implemented using many different technologies. On the other hand, fixed optical delays may also be suitable for certain static operating conditions.

Figure 2:
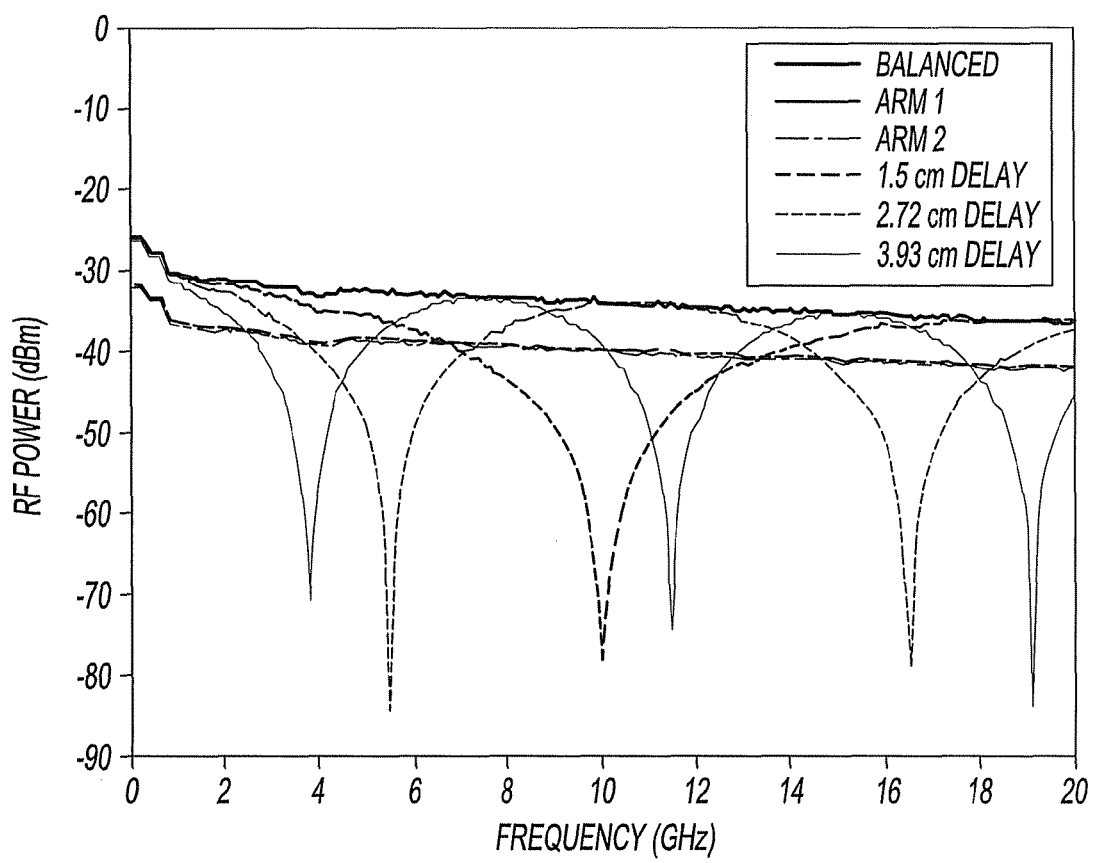
FIG. 2 is a graph illustrating the spectral response of an optical signal at different delay durations.

Introducing a delay into an optical link creates a phase change in the optical signal passing through the optical link, which results in a spectral null when the delayed signal combines interferometrically with the undelayed signal from the second output of the modulator. FIG. 2 illustrates that different delay durations create spectral nulls at different frequencies. For example, a 1.5 cm delay creates a spectral null at approximately 10 GHz; whereas, a 2.72 cm delay creates a spectral null at both 5.5 GHz and 16.5 GHz. In a given application, the frequency at which a spectral null occurs can be determined in accordance with $$\cos^2\left(\frac{\pi n delay}{c}x\right)$$

where x is the frequency of an RF signal, delay is the introduced time delay, n is the refractive index of optical medium which the optical signals are passing through, and c is the speed of light in air. Spectral nulls occur when the argument of the cosine term equals $(2m+1)\pi/2$, where m is an integer. Controller 20 is interfaced with the optical delay mechanism 18 to adjust duration of the time delay applied by the optical delay mechanism. Thus, the frequency at which a spectral null occurs can be controlled via the controller by changing duration of the delay introduced into the optical link.

Figure 3:
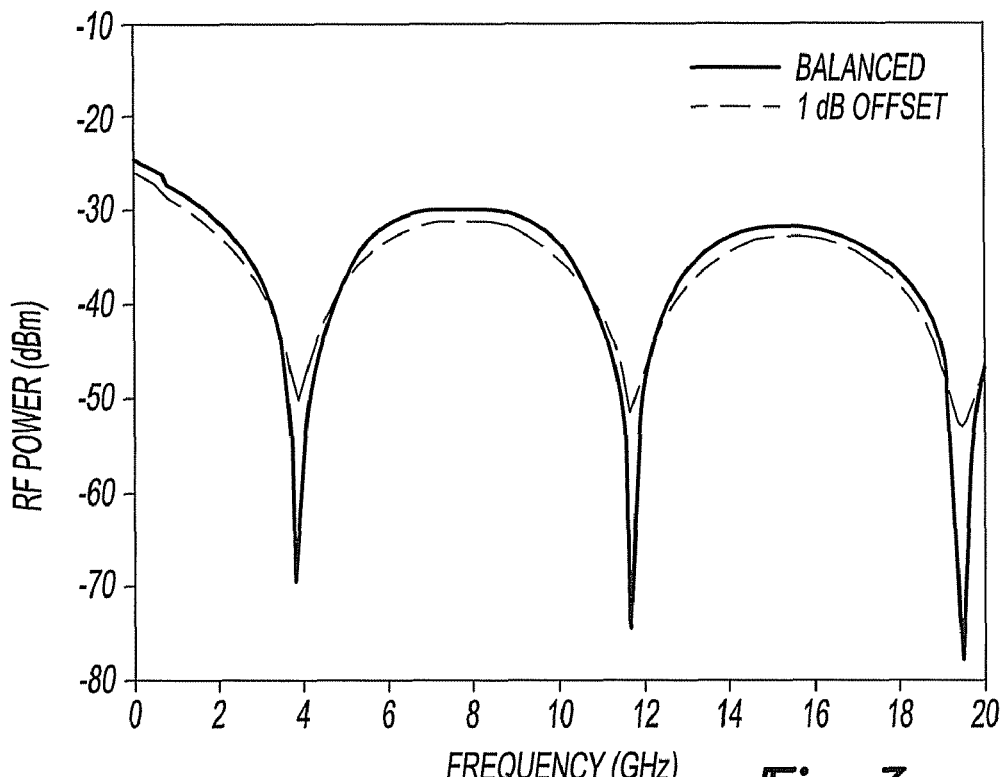
FIG. 3 is a graph illustrating the spectral response when the optical power balance between the two arms of the photonic link is altered.

Furthermore, the depth of the spectral null can be controlled by attenuating the optical power balance between the two arms of the photonic link as shown in FIG. 3. In this exemplary signal, there is a 50 dB contrast between the peak and valley of the signal when the optical power is balanced between the two arms. However, when a 1 dB difference in optical power is introduced between the two arms of the photonic link, the contrast between the peak and valley of the signal is reduced to 20 dB. In an exemplary embodiment, a variable optical attenuator 22 may be used to adjust the power balance between the two arms. The variable optical attenuator 22 is disposed in one of the two optical links and likewise interfaced with the controller 20. In this way, the depth of the spectral null can be controlled via the controller by adjusting the attenuation of the optical signal passing through the variable optical attenuator 22.

Figure 4A:
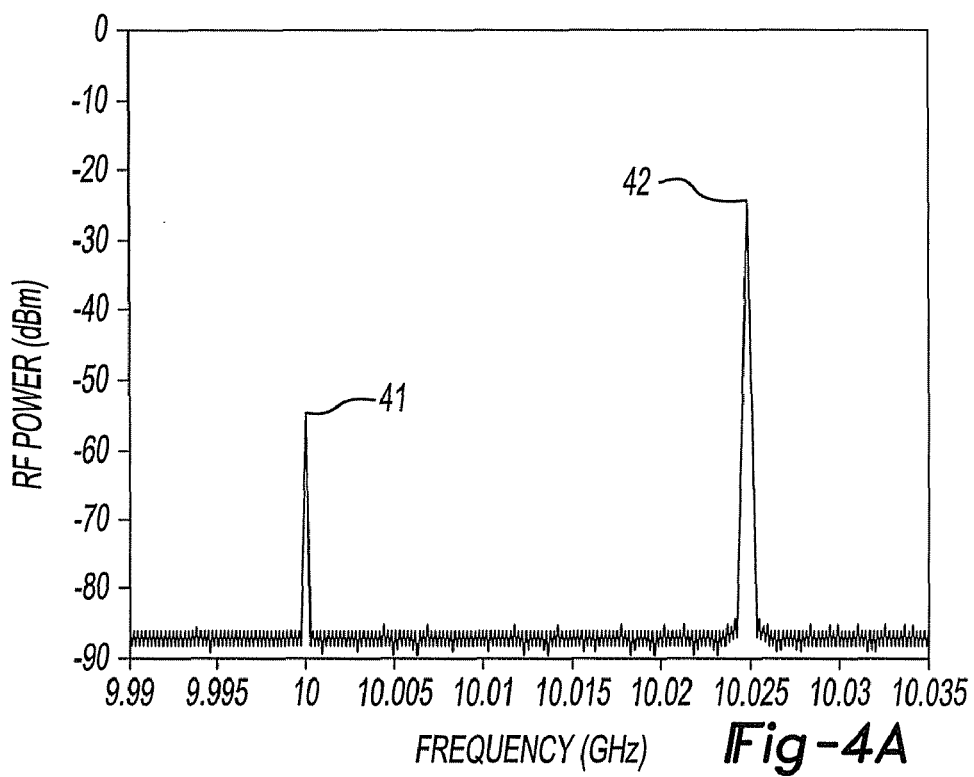
FIGS. 4A and 4B are graphs illustrating how spectral nulls can be used for interference mitigation.
Figure 4B:
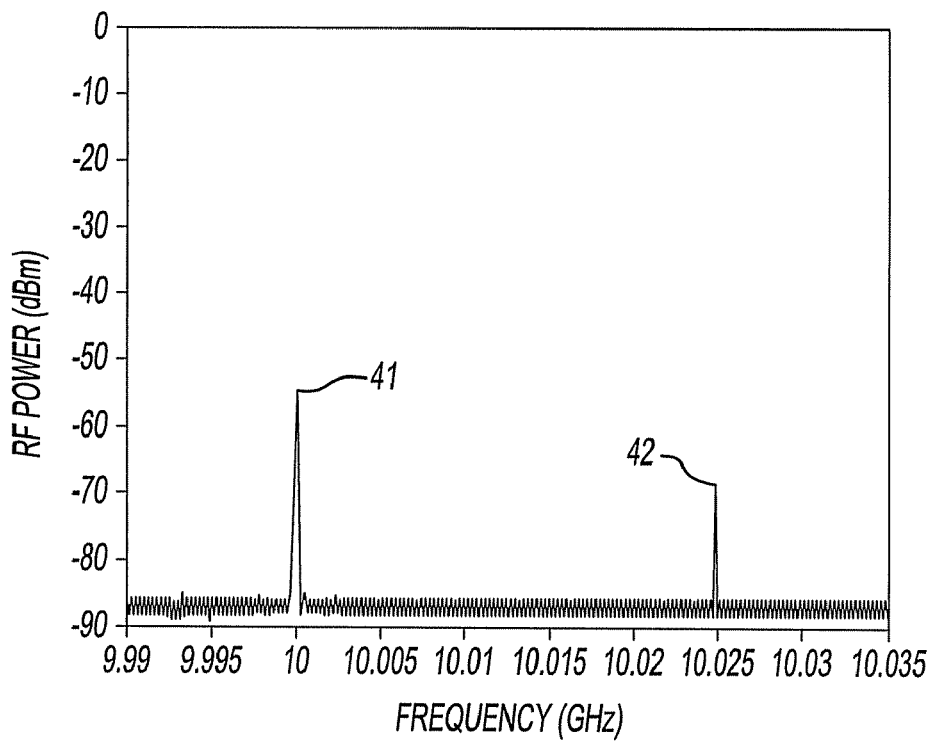

Spectral nulls can in turn be used for interference mitigation as shown in FIGS. 4A and 4B. FIG. 4A illustrates that two RF input signals may be received by the RF photonic link. A signal of interest having an 8 GHz frequency is designated at 41 and an interfering signal having a 12 GHz frequency is designated at 42. With a balanced link, the two RF signals maintain a 30 dB difference. However, a spectral null may be created at the frequency of the interfering signal in the manner described above. In this way, the spectral null offsets the interfering signal, thereby reducing the signal strength of the interfering signal in the manner shown in FIG. 4B. The signal of interest can more easily be acquired from the output of the RF photonic link.

Figure 5:
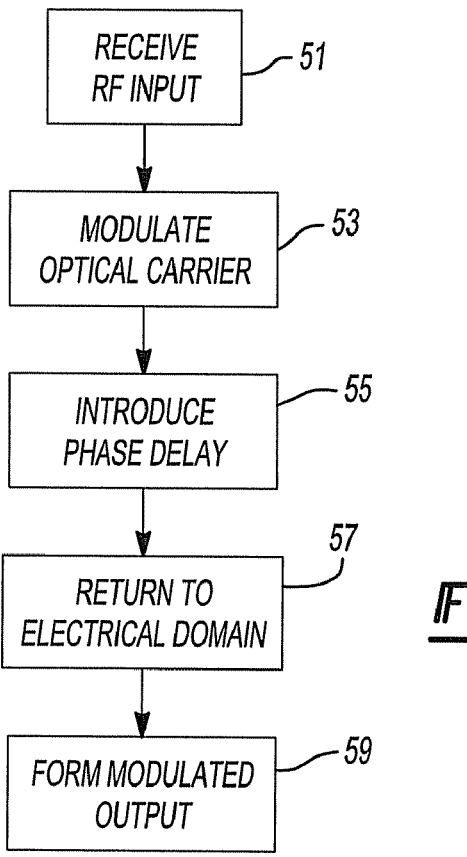
FIG. 5 is a flowchart depicting a technique for co-site interference mitigation in an RF photonic link.

FIG. 5 further illustrates this technique for co-site interference mitigation in an RF communication system. An RF input signal is first received at 51 via an antenna to an RF photonic link. Two optical signals are each modulated at 53 using the RF input signal. To mitigate interfering signals, one or more spectral nulls may be created at 55 in one of the two optical signals. In an exemplary embodiment, a spectral null may be created by introducing a time delay into one of the two optical signals in the manner described above. By adjusting the duration of the time delay, the frequency at which the spectral null occurs can be tuned. Other techniques for creating spectral nulls are also contemplated by this disclosure. The two optical signals (including the time delayed signal) are converted back at 57 into corresponding electrical signals and combined to form a single mitigated output signal. In this way, the RF photonic link outputs a signal where the presence of interfering signals have been mitigated.

Different techniques for determining the frequency at which interfering signals occur are within the scope of the present disclosure. In an exemplary embodiment, a spectrum analyzer may be operably coupled to the RF photonic link. The spectrum analyzer is used to analyze the signal output from the link to identify the presence of interfering signals. The controller may then be used to make adjustments to either the variable optical delay and/or the variable optical attenuator accordingly. In other embodiments, the frequency of the interfering signals may be known or determined in other manners. In any case, an RF photonic link of the present disclosure may be statically or dynamically configured to mitigate such interfering signals.

The RF photonic link described above is suitable for receiving wideband RF input signals. Different end users may be interested in different bandwidths. Therefore, it is contemplated that the optical signals output by the optical modulator may be partitioned into different bandwidths and distributed to different receiving subsystems. Prior to returning to the electrical domain, each receiving subsystem may be configured to mitigate interfering signals in the manner described above.

The above description is merely exemplary in nature and is not intended to limit the present disclosure, application, or uses.

What is claimed is:

1. A method for co-site interference mitigation in an RF communication system, comprising:
   receiving an RF wideband input signal;
   converting the RF input signal to two optical signals in an optical domain;
   mitigating interference of an interfering signal in the optical domain by introducing a time delay into one of the two optical signals to create a spectral null at a frequency of the interfering signal and tuning the frequency at which the spectral null occurs by adjusting duration of the time delay; and
   returning the two optical signals in the optical domain to an electrical domain, where the optical signals interfere to create spectral nulls based on relative phase difference of the signals.

2. The method of claim 1 converting the RF input signal further comprises generating two optical signals and modulating each optical signal using the RF input signal using a Mach-Zehnder modulator.

3. The method of claim 1 further comprises determining the frequency at which the spectral null occurs in accordance with $$\cos^2\left(\frac{\pi n delay}{c}x\right)$$

where x is the frequency of an RF signal, delay is the introduced time delay, n is the refractive index of optical medium which the optical signals are passing through, c is the speed of light in air and spectral nulls occur when an argument of the cosine term equals $(2m+1)\pi/2$, where m is an integer.

4. The method of claim 1 further comprises adjusting depth of the spectral null by attenuating optical power of one of the optical signals.

5. A method for co-site interference mitigation in an RF communication system, comprising:
   receiving an RF input signal via an antenna;
   generating two optical signals that are each modulated using the RF signal;
   creating a spectral null at a frequency of an interfering signal by introducing a time delay into one of the two optical signals and tuning the frequency at which the spectral null occurs by adjusting duration of the time delay; and converting the two optical signals into two corresponding electrical signals and combining the two electrical signals to form a mitigated output signal.

6. The method of claim 5 further comprises generating the two optical signals using a Mach-Zehnder modulator having two output ports.

7. The method of claim 5 further comprises determining the frequency at which the spectral null occurs in accordance with $$\cos^2\left(\frac{\pi n delay}{c}x\right)$$

where x is the frequency of an RF signal, delay is the introduced time delay, n is the refractive index of optical medium which the optical signals are passing through, c is the speed of light in air and spectral nulls occur when an argument of the cosine term equals $(2m+1)\pi/2$, where m is an integer.

8. The method of claim 5 further comprises adjusting depth of the spectral null by attenuating optical power of one of the optical signals.

9. An RF photonic link, comprising:

an antenna;

an optical modulator that receives an RF input signal from the antenna and outputs two optical signals modulated with the RF input signal from two output ports;

a pair of photodetectors optically coupled via optical links to the two output ports of the optical modulator;

an optical delay mechanism disposed in one of the two optical links that operates to introduce a time delay into the optical signal passing through the optical link; and a controller interfaced with the optical delay mechanism to adjust duration of the time delay applied by the optical delay mechanism.

10. The RF photonic link of claim 9 wherein the optical modulator is further defined as a Mach-Zehnder modulator having dual output ports.

11. The RF photonic link of claim 9 further comprises a variable optical attenuator disposed in one of the two optical links.

12. The RF photonic link of claim 9 further comprises a signal combiner configured to receive an electrical signal from each of the photodetectors and output a mitigated output signal.

* * * * *